S. P. HARBISON.
MANUFACTURE OF FIRE-BRICK FOR CONVERTER BOTTOMS.
No. 177,119. Patented May 9, 1876.
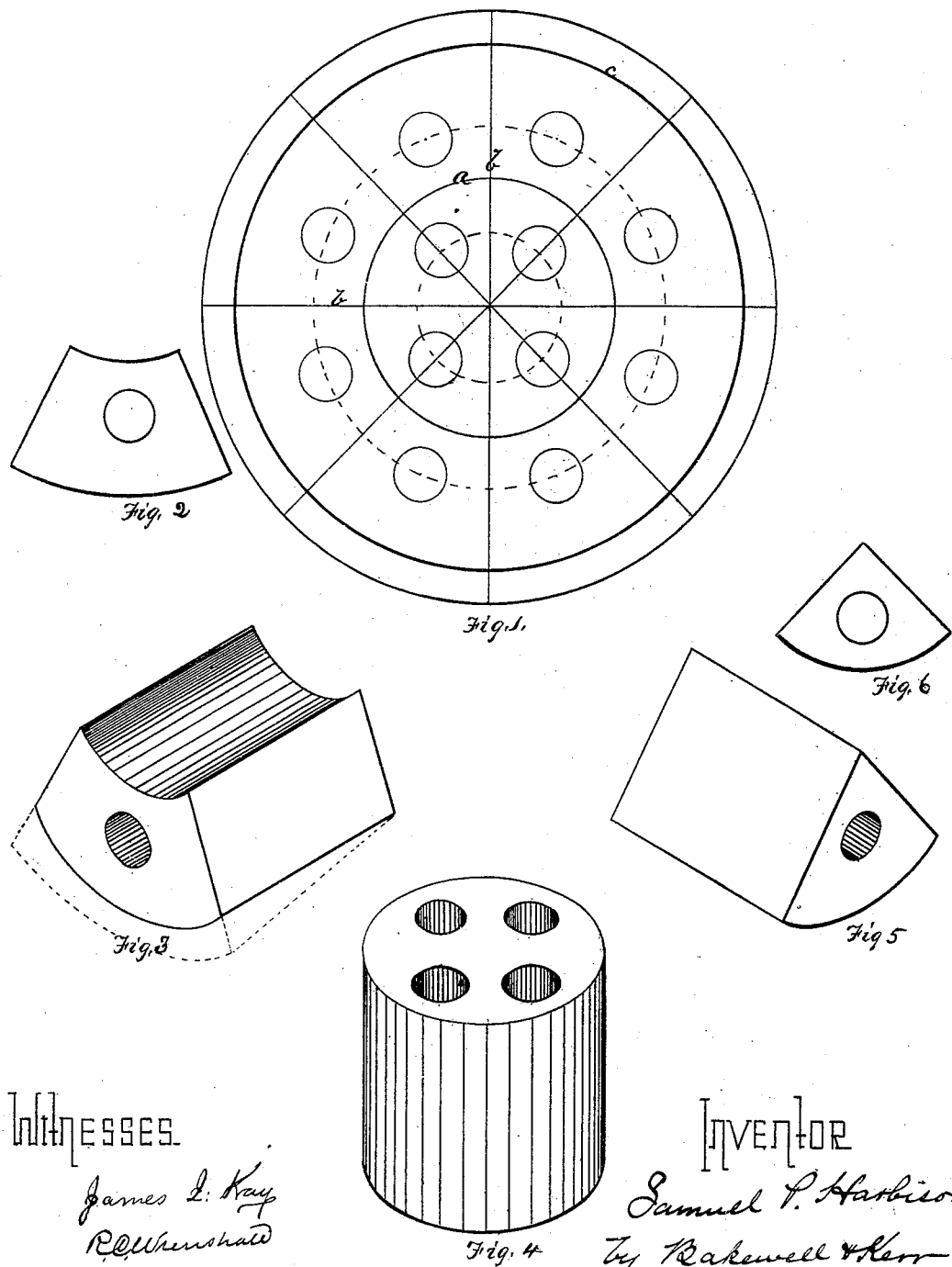

UNITED STATES PATENT OFFICE.

SAMUEL P. HARBISON, OF ALLEGHENY, ASSIGNOR TO HARBISON & WALKER, OF PITTSBURG, PENNSYLVANIA.

IMPROVEMENT IN THE MANUFACTURE OF FIRE-BRICKS FOR CONVERTER-BOTTOMS.

Specification forming part of Letters Patent No. 177,119, dated May 9, 1876; application filed April 3, 1876.

*To all whom it may concern:*

Be it known that I, SAMUEL P. HARBISON, of Allegheny, in the county of Allegheny and State of Pennsylvania, have invented a new and useful Improvement in Manufacture of Fire-Bricks for Converter-Bottoms; and I do hereby declare the following to be a full, clear, and exact description thereof, reference being had to the accompanying drawing, forming a part of this specification, in which—

Figure 1 is a diagram illustrating a converter-bottom formed from bricks embodying my invention. Fig. 2 is an end view, and Fig. 3 is a perspective view, of a tuyere-brick for the outer circle; Fig. 4, a perspective view of the central tuyere-brick; and Figs. 5 and 6 are perspective and end views of a form which may be adopted for one of the central tuyeres when the latter are unusually far apart.

My invention relates to bricks for forming the bottoms of Bessemer and like converters; and consists in tuyere-bricks having concave and convex faces and longitudinal or tuyere holes, and also in a central tuyere-brick of cylindrical form, having a series of longitudinal tuyere-holes, the two forms of tuyere-bricks being adapted each to the other, so as to conjointly form a converter-bottom when properly arranged.

In a converter-bottom the tuyeres are usually arranged equal distances apart, and in two or more concentric circles. Heretofore two methods of forming the converter-bottom have been adopted—first, ramming plastic ganister around the tuyeres; secondly, arranging a series of bricks between and around the tuyeres, and ramming the space between the bricks and tuyeres with plastic ganister. The first method involves much labor and time, and in the second much care is required to fit the bricks, and to close the joints between the bricks and tuyeres, so as to prevent the cutting and destruction of the tuyeres.

The object of the present invention is to provide a series of bricks from which a converter-bottom may be quickly formed, one having close joints at the tuyeres and solid throughout, in accordance with the requirements of the case.

I will now proceed to describe my invention so that others skilled in the art to which it appertains may apply the same.

The space corresponding to the converter-bottom is divided up by a circle, $a$, inclosing the inner tuyeres, and a series of radii, $b$, each of the latter passing midway between two of the outer tuyeres, so as to divide the space between the circle $a$ and the periphery or an outer concentric circle, $c$, into equal sections having each a central tuyere. This will give the proper convexity and concavity and the end section for the tuyere-bricks of the outer circle. The length of the brick will, of course, depend on the thickness of the intended bottom, length of tuyere, &c.

The central tuyere-brick may, if the inner tuyeres are close together, be formed as a single cylinder, but, if the tuyeres are somewhat widely separated, is, preferably, formed in sections of two or four, as indicated by dotted lines, Fig. 4 and Fig. 5, each section having a central tuyere-hole, or each section having one or two tuyere-holes, as the case may be.

As the form for the converter-bottom is widest at the base, the outer circle of tuyere-brick may be formed to correspond thereto, or with a "batter," as shown by the dotted line, Fig. 3, and outer line of Fig. 1. Though, in general, the brick is formed straight or with a slight batter, in other cases, where the joint between the bottom and the converter approaches a horizontal line, another circle of bricks will be necessary to fill up the space outside the tuyeres, and these may have the batter instead of the tuyere-brick.

A proper plan and measurement of the converter-bottom having been obtained, as well as the number and location of the tuyeres, molds of suitable size may be made, and bricks of the forms shown in Figs. 3 and 4, or 3 and 5, having concave and convex faces and longitudinal central tuyere-holes, produced.

In molding the tuyere-bricks a hollow core should be employed and the core drawn last, if which precaution (well known to the pipe-molding trade) is taken, a perfect tuyere-brick is readily obtained.

If the molds have been carefully made from measurements the tuyere-bricks can be readily arranged to register with the tuyere-holes of the bottom plate, so that the tuyeres can be introduced, and the several bricks and the tuyeres will form close joints, which preclude ramming of plastic ganister, and only require "grouting" to form a solid bottom.

The advantages of my improved tuyere-bricks are the readiness with which a converter-bottom may be prepared, and the close joints about the tuyeres, which prevent the cutting and wearing of the tuyere and render the bottom more durable.

Having thus described my invention, what I claim, and desire to secure by Letters Patent, is—

1. The tuyere-bricks herein described, having one or more longitudinal tuyere-holes, substantially as and for the purpose specified.

2. The cylindrical tuyere-brick, having a series of longitudinal tuyere-holes, substantially as and for the purpose specified.

3. A converter-bottom formed by a central cylindrical tuyere-brick, or sections forming the same, and a series of tuyere-bricks having longitudinal tuyere-holes, the whole arranged and combined substantially as specified.

In testimony whereof I, the said SAMUEL P. HARBISON, have hereunto set my hand.

SAMUEL P. HARBISON.

Witnesses:
 JAMES I. KAY,
 L. C. FITLER.